United States Patent Office 3,484,228
Patented Dec. 16, 1969

3,484,228
METHOD OF CONTROLLING WEEDS WITH DITHIODIANILINE COMPOUNDS
Barbara Stearns, Highland Park, N.J., assignor to E. R. Squibb & Sons, Inc., New York, N.Y., a corporation of Delaware
No Drawing. Filed June 3, 1968, Ser. No. 733,782
Int. Cl. A01n 9/12
U.S. Cl. 71—66                                3 Claims

ABSTRACT OF THE DISCLOSURE

Weeds are controlled by contacting said weeds with herbicidal amounts of a dithiodianiline selected from the group consisting of 4,4'-dithiodianiline and 2,2'-dithiodianiline and salts thereof.

---

This invention relates to compositions and methods for the control of undesirable vegetation employing as an essential active ingredient a dithiodianiline selected from the group consisting of 4,4'-dithiodianiline and 2,2'-dithiodianiline and salts thereof.

The control of weeds is of extreme importance in all phases of agriculture. The presence of such weeds in commercial crops results in soil lacking in vital nutrients, thus resulting in lower yields of lower quality crops than would otherwise be obtained.

In order to control such weeds, the farmer has in the past had to rely on time-consuming, constant cultivation of the soil. More recently, he has been able to find some relief through the periodic application of herbicidal compositions. However, the use of many of these materials is limited in terms of expense. Further difficulties are often encountered in that the herbicidal composition has an injurious effect upon the crops themselves when applied in amounts necessary to give effective protection from weeds. There is, thus, clearly a need in the agricultural field for an effective herbicidal composition which is relatively low cost and which provides effective protection in the absence of any untoward effects on crops.

Further, there are many forms of aquatic weeds found in lakes, streams, ponds, swimming pools, reservoirs, swamps, irrigation or drainage ditches, and submerged agricultural plots, such as, cranberry bogs and rice fields, and the like. For example, in a still body of water, such as a swimming pool or a pond, various aquatic weeds, such as algae or duckweed, form and multiply rapidly to the extent that the pond and/or swimming pool becomes unsightly, and in the case of swimming pools the growth may clog pumps, filters and other equipment employed in the circulation system. In agricultural practice where rice is grown in paddies, duckweed has proved to be a serious problem in that it prevents oxygen and sunlight from reaching the growing rice seedlings and thus limits the yield and quality of rice obtained. Other prevalent aquatic weeds frequently found in rice fields of the United States are ducksalad, gooseweed, red stem, and water hyssop. Overgrowth of duckweed as well as various algae and other aquatic weeds, such as milfoil elodea and bladderwort in fresh water ponds interferes with natural flow and causes stagnation. Thus, the need for an effective control of such weeds is clear.

It has been discovered that the application to the weeds of either 4,4'-dithiodianiline and 2,2'-dithiodianiline provides effective control of such weeds at concentrations which are not injurious to crops or wildlife.

In use, these compounds are applied to areas to be protected from weeds in any of a variety of formulations. Preferably the compounds are extended with carriers or conditioning agents of the kind used and commonly referred to in the art as adjuvants or modifiers. Such adjuvants may be inert solids, surface-active agents and/or organic liquids.

The dithiodianilines of this invention are incorporated in such compositions in sufficient amount to exert a herbicidal effect. Usually from about 1 to 95 percent by weight of the compounds are included in such formulations.

Solid formulations may be prepared with inert powders. The formulations thus prepared are used as such, diluted further with inert solids to form dusts, or suspended in a suitable liquid medium for spray application.

The powders usually comprise the active ingredient admixed with minor amounts of conditioning agents. Neutral clays, for example, the absorptive attapulgite or the relatively non-absorptive china clays, diatomaceous earth, walnut shell flour, redwood flour, synthetic fine silica, calcium silicate and other inert solid carriers of the kind conventionally employed in powder formulations are used. Industrial fertilizers and dry soil are useful as conditioning agents, particularly in compositions intended for use against weeds in field crops.

The active ingredient is suitably about 1 to 95 percent by weight of the compositions. The solids preferably are finely divided and have a particle size below about 50 microns or, better, below about 20 microns. Dust formulations are prepared using talc, pyrophyllite, tobacco dust, volcanic ash or other dense, inert solids as diluents.

Liquid compositions are prepared by mixing the active compound with suitable liquid diluent media. The active compound is either in solution or in suspension in the liquid medium. Suitable liquid media include kerosene, Stoddard solvent, xylene, alcohols, alkylated naphthalenes, diesel oil, glycols, and ketones, for example, diisobutyl ketone and cyclohexanone. The active ingredient is preferably from about 0.5 to 50 percent by weight of these liquid compositions. These compositions are used as such or extended by emulsification with water.

Herbicidal wettable powders or liquids suitably include one or more surface-active agents, for example, wetting, dispersing, or emulsifying agents. Compositions containing these surface-active agents disperse or emulsify easily in water to form aqueous sprays. The compositions suitably contain up to 10 percent by weight of the surface-active agents, but some surface-active agents are effective at less than 1 percent.

Surface-active agents are suitably of the anionic, cationic, or nonionic type. Exemplary of such agents are sodium oleate, sulfonated petroleum oils, alkyl aryl sulfonates, sodium laurly sulfate, polyethylene oxides, lignin sulfonates, and the like. Additional suitable agents are described by McCutcheon in Soap and Chemical Specialties, vol. 31, Nos. 7–10 (1955).

In the case of aquatic weeds, periodic treatments may be required for effective control in flowing water. In the case of rooted aquatic plants, it is often desirable to employ the active ingredient in a heavy vehicle such as a granule (e.g., attapulgite clay granules) which will carry it to the stream bed, and which will resist movement by the currents, thus increasing the length of time that the herbicide remains in the vicinity of the weed roots.

On the other hand, to control plants characterized by substantial foliage floating on top of the water (e.g., duckweed, floating fern, water hyacinth, water lettuce, etc.), this active ingredient is more advantageously applied with a carrier lighter than water, such as wood shavings, ground corn cobs or organic emulsions, particularly inverse emulsions. This results in the herbicide being entrapped in the foliage as it floats downstream and thus provides convenient exposure of the foliage to a high concentration of the herbicide.

Herbicidal compositions are applied to cultivated land at a rate of application which is sufficient to exert the desired herbicidal action. Dosage depends on the particular active ingredient, components of the formulation, method of application, type and quantity of weeds, duration of treatment, climatic conditions and lesser factors. Application rates of from 1 to 50 pounds of the active ingredient per acre are usually satisfactory for weed control, but higher rates may also be used.

To control aquatic weeds, the compounds of this invention are applied in concentrations of from about 0.001 to 10 parts per million, preferably from 0.001 to 2 parts per million of water to be treated.

Included among the aquatic plant pests which are conveniently controlled in accordance with this invention are: submersed plants such as bladderwort (Utricularia sp.), bushy pondweed (Najas sp.), coontail (Ceratophyllum sp.), elodea, fanwort (Cabomba sp.), pondweeds (Potamogeton sp.), water milfoil (Myriophyllum sp.), waterweed (Anacharis Elodea sp.), water star grass (Heteranthera sp.), and wild celery (Vallisneria sp.), floating weeds such as duckweed (Lemna), floating fern (Ceratopteris sp.), waterfern (Salvinia sp.), water hyacinth (Eichhornia sp.), water lettuce (Pistia sp.) and water meal (Wolffia), rooted plants with floating leaves such as water lilies (Nuphar sp., Nymphaea sp.) and lotus (Nelumbo sp.), emersed plants such as alligatorweed (Alternanthera), arrowhead (Sagittaria), bulrush (Scirpus sp.), cattails (Typha sp.), lizardtail (Saururus), rush (Juncus sp.), parrotfeather (Myriophyllum), water pennywort (Hydrocotyle sp.), pickerelweed (Pontederia), sawgrass (Cladium), smartweed (Polygonum sp.), spikerush (Eleocharis sp.), water leaf (Hydrolea sp.), water primrose (Jussiaea sp.), cut-grass (Zizaniopsis), black willow (Salix sp.), buttonbush (Cephalanthus sp.) and ditchbank grasses such as southern cutgrass (Leersia), floatinggrass (Paspalum), jaragua (Hyparrhenia), Knotgrass (Paspalum), maidencane (Panicum), common reeds and watergrass (Hydrochloa). The foregoing list is by way of example only and is not intended to limit the scope of the invention.

The following examples are illustrative of the effects of these compounds on various herbs and aquatic weeds.

Example 1

Post herbicidal activity of the two compounds was determined by the greenhouse method of Shaw and Swanson (Weeds, 1:352–365, 1952). Preferably, this method comprises planting in separate containers seeds of corn, soybean and cotton at a depth of about one inch. Seeds of pigweed, crabgrass, mustard and ryegrass are then scattered over the surface and covered with a thin layer (about ¼ inch of soil). Controls are employed in which the corn, soybean and cotton seeds are grown in soil containing no weed seeds. The plants are then grown until the primary leaves of the soybean are fully expanded. One hundred fifty ml. of solution of the chemical is then prepared containing 0.45 gram of chemical for each pound per acre desired. When the plants have grown to the extent indicated, they are sprayed with this solution by means of a specially designed spraying table as described by Shaw and Swanson supra. Ten days after treatment, the plants are inspected and prepared with the controls to determine abnormalities of growth or other injury of the desired plants and effect on the weeds.

In this test at an application rate of 10 pounds per acre, 2,2'-dithiodianiline produced 100 percent control of mustard and pigweed. It also produced about 80 percent control of crabgrass and ryegrass. At the same rate, 4,4'-dithiodianiline gave 90 percent control of pigweed, about 75 percent control of mustard and about 50 percent control of crabgrass.

Example 2

Aquatic herbicidal activity was determined in the following manner. Both duckweed and an algae mixture was grown in Hillman's medium which contains:

|  | Mg./l. |
|---|---|
| $KNO_3$ | 1515 |
| $Ca(NO_3)_2 \cdot 4H_2O$ | 680 |
| $KH_2PO_4$ | 680 |
| $MgSO_4 \cdot 7H_2O$ | 492 |
| $H_3BO_3$ | 2.86 |
| $ZnSO_4 \cdot 7H_2O$ | 0.22 |
| $Na_2MoO_4 \cdot 2H_2O$ | 0.12 |
| $CuSO_4 \cdot 5H_2O$ | 0.08 |
| $MnCl_2 \cdot 4H_2O$ | 3.62 |
| $FeCl_3 \cdot 6H_2O$ | 5.40 |
| Tartaric acid | 3.0 |

The test compounds were then added to half of the tubes. Fronds of duckweed were added to several tubes and mixed algae were added to several others, half containing the test compounds and half not. The inoculated tubes were placed on slanting boards in a 75° F. constant temperature room which was illuminated fourteen hours per day. After ten days incubation, the treated and control tubes were compared. In the control tubes a ten-fold increase in frond numbers of duckweed was observed. A corresponding increase in the growth of mixed algae was also noted. In this test at a concentration of ten parts per million, 4,4'-dithiodianiline gave 100 percent control of both mixed algae and duckweed. At the same concentration 2,2'-dithiodianiline gave 100 percent control of mixed algae and 85 percent control of the duckweed.

Example 3

4,4'-dithiodianiline and 2,2'-dithiodianiline were applied to five aquatic plants (Pithophora, Najas, Potamogeton, Water Star-Grass and Elodea) as a dilute aqueous solution in a concentration of 10 parts per million by weight. Four- to six-inch cuttings of each aquatic plant were placed in a one-gallon glass jar with dechlorinated tap water. The jars were tightly covered to prevent evaporation and contamination of the water. The planted jars were illuminated by cool, white, thin-line fluorescent lamps. The intensity of the illumination of the water surface was from 60- to 100-foot candles. The plants were illuminated for 10 hours each day from 8 a.m. to 6 p.m. They were allowed to remain in the jars for a conditioning period of three weeks, during which time fertilizer was periodically added to the jars. At the end of this time the jars were checked to be sure that the plants were vigorously growing. Any jar with discolored or dead plants was discarded from further use. An aqueous solution containing 10 parts per million of the test compound was then added to the jars and the jars immediately tightly sealed. The jars were then maintained under the same conditions for an additional three weeks as during the three-week conditioning period. At the end of the test period, the effects of the test compounds were evaluated. Evaluation of herbicidal effects for each chemical on each species of plant was by visual observation, with injury to the plant rated on a scale of 1 (no visible injury) to 10 (a dead plant). Ratings from 1 to 3 indicate no, or very slight, herbicidal activity, from 4 to 6 indicate moderate herbicidal activity, and from 7 to 9 indicate definite to severe herbicidal activity. Independent ratings were made on each species of plant. These ratings were then averaged for each of three replications and these results again averaged to determine an overall average effect expressed as percent herbicidal effectiveness. In this test both 4,4'-dithiodianiline (HCl) and 2,2'-dithiodianiline exhibited an average overall effectiveness of over 90 percent. In no case did any rating fall below 7.

Also contemplated within the scope of this invention are the use of salts of dithiodianilines of this invention. Salts coming within the purview of this invention include the acid-addition salts, particularly, the non-toxic acid-addition salts. Acids useful for preparing the acid-addition salts, include, inter alia, inorganic acids, such as the hydrohalic acids (e.g., hydrochloric and hydrobromic acid), sulfuric acid, nitric acid and phosphoric acid, and organic acids, such as oxalic, maleic, tartaric, citric, acetic and succinic acid.

This invention may be variously otherwise embodied within the scope of the appended claims.

What is claimed is:

1. A method for the control of aquatic weeds which comprises contacting said weeds with a herbicidal amount of a compound selected from the group consisting of 4,4'-dithiodianiline and 2,2'-dithiodianiline and acid addition salts thereof.

2. A method wherein a compound of claim 1 is applied to field crops at a rate of from 1 to 50 pounds per acre.

3. A method in accordance with claim 1 wherein the compound is 4,4'-dithiodianiline hydrochloride.

References Cited

UNITED STATES PATENTS

| | | | |
|---|---|---|---|
| 2,654,667 | 10/1953 | Goodhue et al. | 71—103 |
| 2,668,103 | 2/1954 | Goodhue | 71—98 |
| 3,088,818 | 5/1963 | Geering | 71—98 |
| 3,124,447 | 3/1964 | Wineman et al. | 71—98 |
| 3,251,884 | 5/1966 | Geering | 71—98 |
| 3,256,084 | 6/1966 | Kühle et al. | 71—66 |

OTHER REFERENCES

Tomita et al.: Antibacterial Activity, Etc. (1952) CA47, p. 7028 (1953).

Wojahn et al.: Aromatic Disulfides, Etc. (1952) CA47 pp. 9931–32 (1953).

Herschler: Growth Control of Algae (1965), CA62, p. 16905 (1965).

Chemical Week: Yancide Bland Bn (1963), Chem. Week, June 1, 1963, p. 78.

LEWIS GOTTS, Primary Examiner

G. HOLLRAH, Assistant Examiner

U.S. Cl. X.R.

71—67, 87, 98